Feb. 16, 1932.        B. E. BALDUF        1,845,975
                    BUILDING INSULATION
                    Filed July 18, 1929
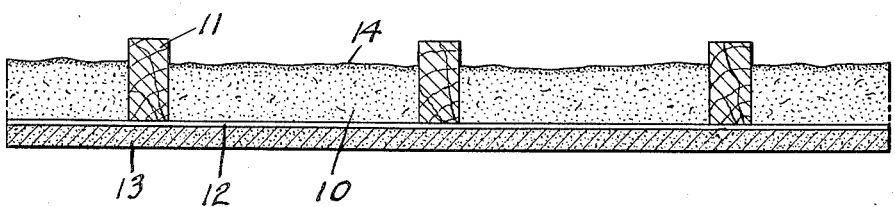
INVENTOR
BRUNO E. BALDUF.
BY
ATTORNEY Patented Feb. 16, 1932

1,845,975

UNITED STATES PATENT OFFICE

BRUNO E. BALDUF, OF CHICAGO, ILLINOIS, ASSIGNOR TO UNITED STATES GYPSUM COMPANY, OF CHICAGO, ILLINOIS, A CORPORATION OF ILLINOIS

BUILDING INSULATION

Application filed July 18, 1929, Serial No. 379,324, and in Canada October 10, 1928.

This invention relates to a fluffy, dry, powdered, heat and sound insulating material and has reference more particularly to an insulating material and the method of applying said material to the walls of buildings to be insulated.

This application is a continuation in part of my co-pending application Serial No. 107,797, filed May 8, 1926, entitled "Insulation".

The insulating composition described in my aforementioned patent application, comprises a mixture of partially dehydrated gypsum and fiber, adapted to be poured in dry form into a wall to be insulated. Owing to the dusty nature of the composition, after the composition is poured in place, the upper portion of the partially dehydrated gypsum composition is formed into a crust by sprinkling the upper surface of the poured composition with water, causing same to set and form a crust for retaining the dust.

An object of this invention therefore, is to provide an insulating composition of the class described which is adapted to be poured in place in ceilings or walls and sprinkled on its upper surface to form a crust for retaining any dust in the composition; also to improve insulation in other respects hereinafter specified and claimed.

Reference is to be had to the accompanying drawing in which the figure is a fragmentary, sectional elevation through a ceiling of a building constructed according to the present invention.

My improved insulating composition is preferably manufactured from waste plasterboard and tile obtained from the gypsum industry. The plasterboards of these waste materials are composed of a core composed largely of gypsum and often having cellulose fibers usually interspersed in the gypsum; this core having paper cover sheets on each surface thereof, also composed of cellulose fibers. These waste materials are passed through a suitable grinding or comminuting mill, such as an attrition mill having two opposed discs, or a swing hammer mill of standard design. A combination of the two types of mills is desirable. The waste material is first roughly broken up in the swing hammer mill and the product is then passed through the attrition mill which serves to thoroughly incorporate the gypsum in the fibers and prevent the later separation of these two components. On passing through these grinding mills, these materials are thoroughly comminuted so that the resulting product is a mixture of fibers and gypsum powder, a portion of the latter being partially or completely dehydrated. The waste materials generally contain a small quantity of partially dehydrated gypsum owing to the fact that the edges of the plasterboards are partially dehydrated as they pass through the drying kiln. When the waste materials have been exposed to the weather, it is desirable to give them a drying treatment before comminution and this drying treatment will dehydrate the gypsum to a certain extent. The grinding operation also dehydrates some of the gypsum due to the heat generated by friction.

Either gypsum tile, which usually contains a low percentage of fiber in the form of shavings, chips and the like, or waste paper itself, is added to the material passing through the mill so that the percentage of fiber to gypsum in the resulting product is maintained from 7% to 12½% by weight. This considerable range of fiber percentage is found possible with fairly good results. With the low percentage of fiber, the density of the resulting composition is high and its heat insulation value is therefore somewhat low. With a high percentage of fiber, the density of the resulting product is less and the fire resistance is not very high but the heat insulation value is very high. As examples of my composition, when the product contains 7% of fiber and 93% of gypsum, the density of the resulting composition when lightly packed in place is about 26 pounds per cubic foot, while with a composition containing 20% of fibrous material and 80% gypsum, the density is approximately 12 pounds per cubic foot when lightly packed in place. The preferred composition contains 7% to 12½% fiber and has a density of 26 to 18 pounds per cubic foot depending on the grinding treatment used.

The gypsum in the resulting composition has a high percentage of water of crystallization, which is given off in the form of steam when the composition is exposed to fire so that the fibers in the composition, which in themselves are combustible, are prevented from catching fire due to the steam which is generated in the composition. In view of the fact that the gypsum is worked into the cellulose fiber, said fibers are thus fireproofed by being surrounded completely by the gypsum. While I prefer wood or other cellulose fibers for my composition, it should be understood that other mineral or animal fibers may be used with fairly good results.

My composition is somewhat dusty in nature and is adapted to be poured in place as a dry material or insulating layer 10 into ceilings and walls or between the joists 11 of attics in dwelling houses or other buildings. The bottom of the insulating layer 10 is supported on plaster boards 12 secured to the bottom of joist 11, and the lower face of said plaster boards is covered with the usual plaster layer 13. In order to keep the dust from blowing about after the mixture is placed in the structure, I sprinkle the upper surface of the composition lightly with water by means of a sprinkling can or other suitable device. This sprinkling treatment causes the partially dehydrated gypsum in the upper surface of the composition to hydrate, set and form a crust 14. the latter serving to retain the balance of the composition in place and prevent it from being blown out in the form of dust.

I would state in conclusion, that while the illustrated example constitutes a practical embodiment of my invention, I do not wish to limit myself precisely to these details since manifestly, the same may be considerably varied without departing from the spirit of the invention as defined in the appended claims.

Having thus described my invention, I claim as new and desire to secure by Letters Patent:

1. The method of preparing a thermal insulating product for buildings, which comprises combining a mixture of gypsum and paper fibers into a homogeneous insulating layer, a portion of said gypsum being dehydrated, and applying water to an exposed surface of said layer so a surface crust is formed thereon by the setting of the dehydrated gypsum to prevent dusting of the remaining powdered material in said layer.

2. The method of preparing a thermal insulating product for buildings, which comprises combining a mixture of gypsum powder and fiber in the form of an insulating layer, a portion of said gypsum being partially dehydrated, and sprinkling an exposed surface of said mixture with water so that a surface crust is formed thereon by the setting of the gypsum, said crust being adapted to prevent dusting of the remaining powdered composition.

3. An insulating material adapted to be poured in a dry state into structures to be insulated against heat and sound, said material comprising finely combined gypsum and an organic fibrous material blended together, a portion of said gypsum being partially dehydrated and a crust formed on an exposed surface of said composition by rehydration of the gypsum in the crust.

4. An insulation in the form of a layer comprising a light weight, evenly blended, finely powdered gypsum and an organic fibrous material, and sufficient water sprinkled on an exposed surface thereof to form a crust to prevent the remaining powder from dusting.

5. The method of preparing an insulating product which comprises combining a mixture of 87½% to 93% of gypsum, some of which is partially dehydrated, and 12½% to 7% of organic fibers, so that the resulting composition is a light, fluffy mixture of fiber and gypsum, the latter being homogeneously mixed throughout the mass of fiber.

6. A fluffy, powdered, fire-resistive insulation layer comprising dry gypsum, some of which is partially dehydrated, 7% to 12½% of fibrous material intimately mingled in said gypsum to form a homogeneous, fluffy, fibrous powder, and sufficient water applied on an exposed surface of the powder to form a crust of rehydrated gypsum adapted to prevent the remaining powdered material from being blown about.

7. The method of insulating a structure for thermal and sound insulation, which comprises applying to said structure a layer of finely ground, partially calcined gypsum, and an organic fibrous matter, and in applying to an exposed surface of said layer, sufficient water to form a crust on the surface of the powder by the rehydration of the gypsum, so that the remaining powdered material will remain in place.

8. The method of applying a powdered material as a fire-resistive or other insulation, which comprises the combination of dried, rehydrated calcined gypsum and organic fibrous material until the product is in the form of a homogeneous, fluffy powder, spreading this fine, fluffy powder in a layer over the surface to be insulated, and sprinkling the exposed surface of the powdered material with sufficient water to form a dust retaining crust thereon.

9. The method of preparing an insulating product which comprises combining a mixture of gypsum and fibers by thorough comminution to give a light, fluffy composition having a density of 18 to 26 pounds per cubic foot, said composition having some gypsum in partially dehydrated condition, and being adapted to be poured in a dry state into structures to be insulated to form an insulating layer giving off steam when subjected to fire.

10. A ceiling construction comprising ceiling joists in spaced, parallel relation, a covering material secured to the lower portions of said joists, an insulating layer of a mixture of finely ground, partially calcined gypsum and organic fibrous matter on said covering material between said joists, and a crust of hydrated gypsum formed by sprinkling water on an exposed surface of said insulating layer.

11. The method of preparing an insulating layer for buildings, which comprises comminuting plasterboards having a gypsum core and paper cover sheets to produce a light, fluffy composition having the gypsum partially dehydrated due to the heat generated by comminuting, forming said composition into a layer having a surface exposed to the atmosphere and moistening said exposed surface to produce a crust for preventing the remainder of the composition from being blown about.

12. The method of insulating a structure for thermal and sound protection which comprises comminuting dry, gypsum plasterboards to form a light, fluffy mixture of partially hydrated gypsum and paper fibers, pouring said mixture in a dry state into the structure, and applying water to the exposed surface only of said mixture thus forming a crust on said surface by the rehydration of the gypsum, so that said crust prevents the remaining dry mixture from being blown away.

BRUNO E. BALDUF.